C. H. TALLMADGE.
MECHANICAL CARD ACCOUNTING.
APPLICATION FILED OCT. 10, 1913.

1,247,899.

Patented Nov. 27, 1917.
3 SHEETS—SHEET 1.

Witnesses:
Robert F. Bracke
Albin E. Ahlberg.

Inventor
Charles H. Tallmadge
By Brown, Williams, Bell, Hansen & Boettcher
Attorneys

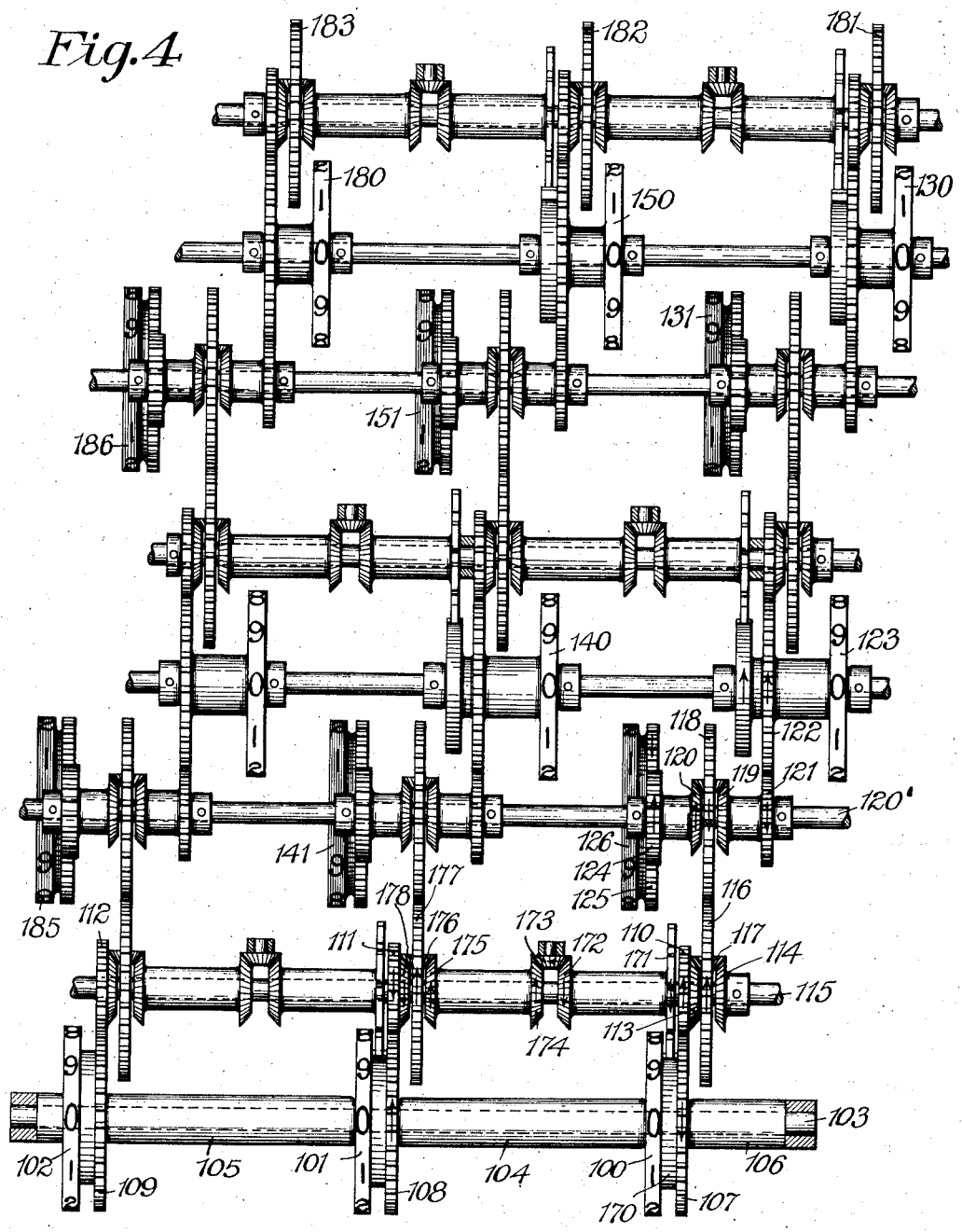

UNITED STATES PATENT OFFICE.

CHARLES H. TALLMADGE, OF BUFFALO, NEW YORK, ASSIGNOR TO WILLIAM R. HEATH, OF BUFFALO, NEW YORK.

MECHANICAL CARD-ACCOUNTING.

1,247,899.  Specification of Letters Patent.  Patented Nov. 27, 1917.

Application filed October 10, 1913. Serial No. 794,426.

*To all whom it may concern:*

Be it known that I, CHARLES H. TALLMADGE, a citizen of the United States, residing at Buffalo, in the county of Erie and State of New York, have invented a certain new and useful Improvement in Mechanical Card-Accounting, of which the following is a full, clear, concise, and exact description, reference being had to the accompanying drawings, forming a part of this specification.

My invention is an improvement in the art of mechanical card accounting, as exemplified by the well-known Hollerith methods and devices.

My invention may be regarded as based upon the recognition of the fact that in double-entry bookkeeping each transaction ordinarily recorded in greater or less detail in a journal, involves, typically, a debit in one ledger account and a counterbalancing credit in some other ledger account, and of the further facts that, while a considerable degree of intelligence is required in determining which ledger account is to be debited and which ledger account is to be credited, and a high degree of skill is required in making the original entries, the subsequent operations, consisting of the so-called posting from journal to ledger and the balancing of the ledger, involve merely routine clerical work, which neither requires nor permits any discretion as to what shall be done. If each journal entry is made the subject of two entries in ledger accounts, the entry in one account being made debitingly and in the other account creditingly, and if the amount entered in one of the ledger accounts is identical with the amount entered in the other, the ledger (properly footed) will "balance". If, furthermore, in each instance the posting is made in conformity with the designation of ledger accounts and amount as entered in the journal, then the ledger will not only balance, but it will be in harmony with the journal, both as a whole and as to each account. Both of these results, the balance and the harmony, are essential to correct double-entry bookkeeping; but while the subsequent routine operations in securing them are very simple in theory, they are far from easy of performance in practical bookkeeping, being liable to the following principal classes of errors:

The omission to post the original entry, in whole or in part;
The duplication of such posting;
The posting of a wrong amount;
The posting of the correct amount to the wrong account, or to the wrong side of the right account;
The erroneous footing or netting of one or more accounts, two such errors sometimes offsetting each other in such a way that the ledger apparently balances while containing more or less serious error;
And finally, the erroneous combining of the balances of the appropriate accounts into the unique syntheses known as the balance sheet and the profit and loss statement.

It is not the purpose of my invention to avoid the necessity for the exercise of discriminating intelligence in making the proper original entries, including both the representation of the amount of the transaction and some appropriate designation, in each case, of the ledger account to be debited and the ledger account to be credited; but it is my purpose to substitute mechanical processes and means for the mental and manual work in posting from the original entries into the ledger and in balancing the various ledger accounts and the ledger as a whole. In so doing, I greatly reduce and for the most part wholly eliminate the liabilities to error in the routine operations above set forth, and also greatly reduce the time required to balance the ledger and obtain the surplus or profit figures, and I thus render it feasible to secure these valuable results daily, without the great labor now required, which is practically prohibitive.

In carrying out my invention I have found it desirable to make use of much that is disclosed in certain inventions of Herman Hollerith, as described for example in Hollerith's United States Patents Nos. 395,781; 395,782; 395,783; 682,197; 685,197; 685,608; 695,933; and Reissue No. 12,523. These Hollerith patents disclose cards or stencils which may be punched with holes in positions determined by and corresponding with the sets of data to be classified and tabulated. They also disclose machines for punching the cards and sorting them into classes or groups, this sorting or classification being controlled by the position of the holes punched in a classification field of each card. They also disclose a computing machine for adding or totalizing the amounts represented by the holes punched in an amount field of each card of any group which it is desired thus to tabulate.

The best mode in which I have contemplated applying the principle of my invention involves the use of these devices of the Hollerith patents and my invention may, in so far, be regarded as an improvement upon the inventions disclosed in the said Hollerith patents. While the use of my invention permits the automatic attainment of important results which have heretofore involved a large amount of mental and manual labor, it may be very simply and briefly described by having recourse to the disclosures of the aforesaid Hollerith patents.

In preferred simple concrete form, my invention involves the provision of record cards, one field or space of each of which cards is assigned to the amount of the transaction which the card is to represent. Another field or space is assigned to those accounts which are to be debited and another field or space is assigned to those accounts which are to be credited. For convenience, at least, these three fields of each of the record cards are printed with columns of digits running from 0 to 9. The record card may be made to represent the amount of a given transaction by punching holes through the spaces occupied by the printed digits corresponding with the amount of the transaction. In accordance with my invention, each of the accounts, which may conveniently be thought of as a ledger account, is given a number. Thus the cash account may be known as account No. 010 and the restaurant receipts account as No. 869, etc. In accordance with my invention, each transaction involves not merely the punching of the amount in the amount field of a record card, but also in every instance the punching in the debit field of the number of the account to be debited and in the credit field the number of the account to be credited. This punching in both the debit and credit fields of each and every card corresponding with each and every transaction is a necessary feature of my invention when applied, as is my intention, to accounting by the aid of the Hollerith system of business transactions and conditions upon the principles heretofore followed in double-entry bookkeeping. It is convenient also in the practice of my invention that any combination of figures in the debit field shall designate precisely the same ledger account as the same combination of figures in the credit field. Thus, to illustrate, the combination of figures 010 when punched in the credit field designates the cash account just as truly as does this combination of figures when punched in the debit field. In the same way, the merchandise account, the bills receivable account, the bills payable account and every other account will be given some one number or combination of figures, and any one of these numbers will refer to its own particular account and no other, and this too regardless of whether the number is punched in the debit field or in the credit field.

In accordance with my invention, one such record card is punched with the number of the account to be debited, the number of the account to be credited, and with the amount, in strict conformity with each of the business transactions of the day. The whole lot of record cards thus punched in conformity with say, a day's transactions are sorted, preferably by means of the Hollerith sorting machine. The lines of division to be observed in this sorting of the cards will be dependent upon the particular results which it is desired to secure. If, for example, we wish to secure the total debits and credits to each of the primary ledger accounts, the sorting and subsequent tabulation may be handled as follows: All of the cards which are punched with the number 001 in the debit field will be sorted into a single group separate from all the other cards of the lot. Then all of the cards which are punched with the combination 002 in the debit field will be separated into a group. Presently, the cards representing a debit to cash will be collected into a group, all of the cards in this group being punched in the debit field with the number 010. Finally, the cards representing a debit to account No. 869, and the other cards representing debits to each of the other accounts, will all be sorted into groups. The record cards of each group will represent all of those transactions in which the particular account is to be debited.

The next step involves the computation of the total debits to each ledger account. These computations are made automatically by running each group of cards through the Hollerith computing machine, as disclosed, for example, in Hollerith Patent No. 998,095. Thus, to illustrate, the group of cards whose debit fields are punched with the designation of account No. 001 will be run through the Hollerith computing machine, which will compute and exhibit the total of all of the amounts represented upon the cards of this first group. In like manner, the cards of every other group are run through a Hollerith computing machine to determine automatically the total debits to cash, merchandise, bills payable, bills receivable, etc. We now have the tabulation of the amounts to be debited to each and all of the various ledger accounts.

It is now necessary to secure a tabulation of the amounts to be credited to each and all of these same accounts. This is accomplished by returning all of the record cards to the sorting machine, whereupon they are again sorted into separate groups. The line of division between the several groups is based in this case, however, upon the punchings in the credit fields of the several cards. For example, all of those cards whose credit fields are punched with the number 001 will be sorted and collected into one group. All of the cards whose credit fields are punched with the numerals 002 will be sorted into a second group and, in like manner, all of the record cards will be sorted into separate groups such that all of the cards in each group will have the same account number punched in their credit fields.

We are now ready to compute and tabulate the amounts to be credited to the several accounts. This is accomplished by running the cards of each group through a Hollerith computing machine, which will automatically compute and display the total of the amounts punched in the cards of each group. When the cards of all of the groups have thus been computed, we have a tabulation of the amounts to be credited to the several accounts. It will be apparent, therefore, that the counterbalanced punching of the record cards enables us to secure automatically the total debit and total credit to each account.

Inasmuch as the balance is the essence of an account, and as it is not necessary that any given card should remain permanently in the file of any particular account, after it has been totaled with its fellows (especially when the cards pertaining to any given account may be conveniently reassembled in that account, if needed), it will be evident that the substance of my generic process may be preserved while using only one card for each transaction, if that one card is twice handled, once debitingly and once creditingly. In this particular form of the process, therefore, at any convenient time, as daily in heavy accounts and weekly in others, all the primary cards may be sorted according to the account-debitable, and the total debit to each account may be ascertained and recorded, either on a separate sub-total card or otherwise; and then the same primary cards may be sorted according to the account-creditable, and the total of each account may likewise be ascertained and recorded, either separately or in combination with the debit to the same account; and at subsequent convenient dates the intervening debits and credits to each account may be similarly ascertained and may then be combined with the totals of the previous date or dates.

In practice, I prefer to punch counterbalancingly two cards representative of each transaction. One of the two cards may be white and the other red, in which case the white cards may be sorted and computed to secure the total debits, while the red cards are sorted and computed to secure the total credits. This use of two cards representative of each transaction avoids the necessity for twice sorting the same cards. It also permits the formation of an exclusive and permanent file for each ledger account, commonly composed of both debit and credit cards, easily distinguishable by color. While each card of the set has both debit and credit fields, the credit field may be ignored on the white or debit card, and the debit field may be ignored on the red or credit card.

It is frequently desirable in practice also to punch a third and differently-colored card. Thus, for example, a yellow card may be punched simultaneously with the white card and the red card. The yellow cards may be regarded as constituting a journal record of all the transactions. If the three cards are disposed, one upon another, and punched simultaneously and in precisely the same manner, then the yellow cards may be referred to an auditor, who is enabled to check the punching to see that they correctly represent the accounting of the transactions with which they should conform. If the auditor finds that the yellow cards are correctly punched, it goes without saying that the white cards and the red cards will also have been correctly punched, and it is found in practice that the sorting and computing machines can be relied upon implicitly to sort the cards and compute the totals in conformity with the punchings. Since, therefore, the accuracy of the punching of the journal cards is proof of the accuracy of the whole accounting process, the work of checking or auditing is greatly facilitated. Furthermore, the only auditing that is requisite can be carried on simultaneously with the sorting and computation of the debit and credit cards, thus obviating any delay in securing the final results and in establishing the accuracy of the final results.

If the checking of the yellow cards alone to establish the accuracy of the punching of all three cards discloses an inaccuracy in the punching of any set of cards, it is only necessary to recall the erroneously punched white and red cards of the set or, if they have already been sorted and computed, it is only necessary to punch a new set of cards with the debit and credit punchings reversed and to send this "cancellation" set of cards through the usual steps of the process in order to clear the error. A new and correctly punched set of cards may then be sent through the usual processes to bring about the results which would have been obtained in the first instance except for the inaccuracy of the original punching of a particular set of cards.

A few years ago, it was customary to ascertain the state of a business once a year. While that is perhaps still the most common custom, there are progressive business houses in which the books are closed quarterly, or even monthly. The advantage of the monthly closing of the books is that the managing head of the business can ascertain from month to month the amount of his assets, the amount of his liabilities, the amount of his surplus, etc. It is these highly generic accounts and balances which truly and clearly reflect the condition of the business, and the progressive manager is unwilling to wait from one year's end to another in order to ascertain what the condition of his business may be. In most cases, the manager would welcome a daily showing of the condition of his business, but the accounting methods of the prior art have made this practically impossible because of the labor involved in the routine work of posting, footing and balancing the accounts.

My invention makes it entirely feasible to secure a daily statement of the condition of the business, in other words, a daily showing of assets, liabilities, surplus, etc. It is the showing of assets, liabilities, and surplus, which most readily indicates the condition of a business. If, therefore, the head of a business can have placed before him each day a showing of assets, liabilities and surplus, and can note their variations from day to day, he has in hand a means for detecting at once any tendency of the business to vary widely from its normal course. He is notified, therefore, of any abnormality almost from the time of its existence and he is put at once, therefore, into a position to investigate and determine the reason for the abnormality and to take steps to correct or take advantage of the unusual condition as reflected in the statement placed daily before him.

It is possible and feasible to secure these daily statements in the use of my invention, since, in the first place, the several ledger accounts may be classified broadly as asset accounts or as liability accounts or as expense accounts, or as revenue accounts. These broad classes of accounts have this peculiar interrelation: The difference between the total assets and the total liabilities is the surplus, and the difference between the total expenses and the total revenues is the profit, and in any properly constituted set of books the profit (or loss) and the surplus (or deficit) for any given period are equal in amount. After the cards have been punched, therefore, they may be sorted first in accordance with the broad classification just referred to, that is to say, the debits to asset accounts may be sorted into a separate group, the debits to liability accounts may be sorted into another group, the debits to expense accounts may be grouped, and the debits to revenue accounts may be segregated. So also the credits to each of these classes may be separately grouped. These eight groups may then be computed in a few moments by running the several groups through the Hollerith computing machines with the result that we shall have at once the total debits and the total credits to assets, liabilities, expenses and revenues. These give us at once the net assets and the net liabilities, as also the net expenses and the net revenue. The difference between the net assets and the net liabilities is the surplus, whereas the difference between the net expenses and the net revenues is the profit. The profit will equal the surplus accumulated in any given period of time. If these balances as determined by the operation of the Hollerith computing machines are equal it may be assumed fairly that the sorting and computation has been accomplished with that mechanical accuracy which is to be expected. If for any reason the profit should differ from the surplus, it is an indication of some mistake as, for example, the loss of a card. The warning thus promptly given enables the mistake to be ascertained and as promptly corrected.

After the record cards have served their purpose in showing the assets, liabilities, surplus, etc., they may be re-sorted into groups conforming with the scheme of primary ledger accounts and made the basis of such computations and tabulations as were first referred to in this description. It will be apparent that the broad classification and grouping of the record cards to secure an immediate showing of assets, liabilities, surplus, etc., will introduce but very little, if any, delay in the process of ascertaining the daily balances in all of the primary ledger accounts.

These various features of my invention can be described in greater detail in connection with the accompanying drawings, in which—

Fig. 4 illustrates in detail the manner in which the totalizers may be connected together in order to operate in conformity with the diagram of Fig. 3.

Figures 1, 2:
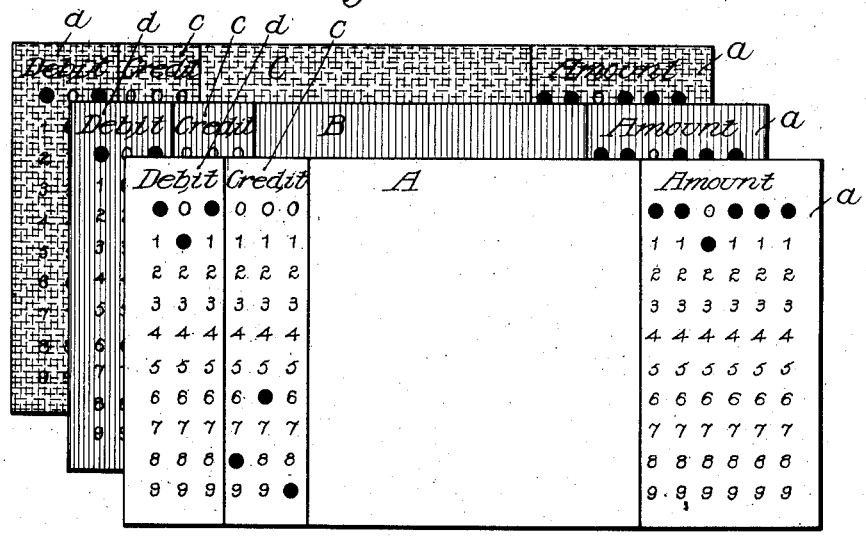
Figure 1 illustrates a set of record cards.
Fig. 2 illustrates one manner in which the record cards may be grouped for certain purposes.

In Fig. 1, I have shown a white record card A, a red record card B, and a yellow record card C. Each of these cards comprises an amount field *a*, a debit field *d* and a credit field *c*. Upon each of these fields is printed one or more columns of digits from 0 to 9 inclusive, one column being assigned to the units order, one column to the tens order, one to the hundreds order, another to the thousands order, etc. The three cards shown in Fig. 1 may be superposed one upon the other. These cards may be placed in a Hollerith punching machine, as shown, for example, in Patent No. 682,197. If the amount of the particular transaction is $10.00, a hole will be punched through the numeral 1 in the fourth order, while other holes will be punched through the zeros both to the left and to the right of the fourth column. If the account to be credited is No. 869, a hole will be punched through the numeral 8 in the third column of the credit field, another hole will be punched through the 6 in the tens column and another hole through the 9 in the units column of the credit field. If the account to be debited is account No. 10, then a hole will be punched through the numeral 1 in the tens column of the debit field, while other holes will be punched through the zeros in the hundreds and the units columns of figures in this field.

All three of these cards when thus punched will indicate the fact that the particular transaction under consideration involves a debit to account No. 10 and a credit to account No. 869, and that the amount of the transaction is $10.00. A like set of three cards is punched in accordance with the facts or data of every other transaction, the punching of all of the cards being done in conformity with a fixed standard which is pre-arranged and to which the person who punches the cards must have recourse or familiarity. Thus the standard will designate each account by a number different from that assigned to any other account and the operator in punching the cards representative of each transaction must punch the holes in the several fields in conformity with this pre-arranged and fixed standard.

Although there are advantages to be secured in the use of triplicate cards, such as are shown in Fig. 1, it is possible to carry out my invention with but a single card representative of each transaction. I have heretofore explained the manner in which the sorting and computing is carried out when a single card is used. I have described also how the sorting and computing may be carried on when two cards are used, one white and one red. I have described also how the yellow journal card may be used for the purposes of audit, thereby permitting the white and red cards to be sorted and computed without delay, and providing the advantage also that a single perception of the amount and of the identity of the accounts to be debited and credited will serve to check the accuracy of the punching of both the white card and the red card. The yellow cards would ordinarily be filed in chronological order corresponding more or less closely with the order in which the transactions have occurred, whereas the white cards and the red cards, after they have been sorted and computed, are filed in groups, each group being peculiar to its own account.

If it is desired at once to secure the statement of assets, liabilities and surplus, and expenses, revenues and profit, all of the cards which have been punched to represent say a day's transactions, will be sorted into eight groups, as indicated in Fig. 2. If the duplicate cards, one white and one red, are used, as indicated in Fig. 1, then the four groups of cards at the left will be used in tabulating debits, while the four groups at the right will be used in tabulating credits.

All of the primary ledger accounts can be classified under one of four heads, as follows: asset accounts, liability accounts, expense accounts and revenue accounts. For convenience in sorting the cards, it is desirable in practice to number all of the asset accounts within a given range, all of the liability accounts within a given range, etc. Thus, in the illustration which I have chosen, I have numbered all of the primary ledger accounts which may be classified as asset accounts with numbers from 1 to 299; the liability accounts are numbered from 300 to 599; the expense accounts are numbered from 600 to 799, and the revenue accounts are numbered from 800 to 999. It will be noted that these numbers are assigned to the different classes of accounts in even hundreds, as indicated by the shading upon the debit and credit fields of the cards shown in Fig. 2. Thus, the debit field of the card at the upper left-hand corner is shaded over the space in which any number from 1 to 299 would be punched. This shading, of course, does not appear on the cards, but is shown in the figure merely to indicate the groups.

It is necessary now to sort the debit cards into four groups according as the accounts represented by the several cards fall into one or another of the four classes: assets, liabilities, expenses, revenues. This sorting is accomplished by the use of a Hollerith reissue sorting machine, such as is illustrated in Hollerith Patent No. 12,523. The assignment of the numbers to the four classes of accounts in even hundreds greatly facilitates the sorting into groups, as indicated in Fig. 2. Thus, for example, all of the white cards which are punched in the 0, 1, or 2 space of the hundreds column will fall into one group, and no card which is punched in any other space in the hundreds column will fall within this group. A single sorting of the cards based upon the punching in the hundreds order alone will, therefore, suffice to separate the cards into the four debit groups, as indicated at the left of Fig. 2. In like manner, a similar sorting of the red cards in accordance with the punching in the hundreds column of the credit field alone will suffice to separate the credit cards into the four necessary groups. The group of cards at DA are the cards representing transactions involving debits to asset accounts; the group indicated at DL is comprised of cards representing transactions involving debits to liability accounts; the group indicated at DE comprises cards representing transactions involving debits to expense accounts, and the group indicated at DR comprises cards representing transactions involving debits to revenue accounts. The credit cards are grouped in like manner—that is to say, the group indicated at CA comprises cards representing transactions involving credits to asset accounts; the group indicated at CL comprises cards representing transactions involving credits to liability accounts; the group indicated at CE comprises cards representing transactions involving credits to expense accounts, and the group indicated at CR comprises cards representing transactions involving credits to revenue accounts.

The uppermost card of the group DA is punched with number 10 in the debit field and with number 869 in the credit field, and is punched to represent $10.00 as the amount of the transaction. This punching means that the transaction represented by this particular card involved a debit to primary account No. 10, which in this illustration is the number of the cash account. In this illustration also, account No. 869 is restaurant receipts. This card represents a transaction involving the receipt of $10.00 from or by the restaurant. For convenience, I have put the corresponding credit card on the top of the group CR. The cash account is an asset account, and the white card representing this particular transaction, therefore falls in the DA group. The restaurant receipts account is a revenue account, and the red card representing this transaction, therefore falls in the CR group. The uppermost card in the DL group is punched with the number 360 in the debit field, and with the number 725 in the credit field, and to represent $7.00 as the amount of the transaction. Primary account No. 360 is a liability account, and this debit card therefore falls in the DL group. Account No. 725 is an expense account, and the corresponding red card falls, therefore, in the CE group; and for convenience I have shown this particular card at the top of the pile.

Account No. 612 is an expense account: the card whose debit field is punched with this number, therefore, falls in the DE group, as shown. This particular card represents a transaction involving a credit to the cash account No. 10. Since the cash account is an asset account, the corresponding credit card falls in the group CA, as shown at the upper right-hand corner of Fig. 2. Account No. 980 is a revenue account. The transaction represented by the card whose debit field is punched with the number 980 falls, therefore, in the DR group, as shown. The transaction represented by this particular card involved a credit to account No. 360. Since account No. 360 is a liability account, the corresponding credit card falls in the CL group, as shown.

When the cards have been divided into the eight groups, as illustrated in Fig. 2, each group is run through a Hollerith computing machine, as shown, for example, in Hollerith Patent No. 998,095, whereby the total of the debits to asset accounts, the total of debits to liability accounts, and the totals of the debits and credits represented in the remaining groups are secured, whereupon the surplus or deficit and the profits or loss are directly ascertainable.

If but a single card representative of each transaction had been punched, it would be necessary, first, to group the cards in accordance with the punchings in their debit fields, whereupon the total of the debits to each of the four classes of accounts would have been computed; then the cards would have been re-sorted in accordance with the punchings in the credit fields, whereupon the credits to the four classes of accounts would have been computed.

For the sake of simplicity in explanation, I have referred merely to four broad classes of accounts. It is frequently desirable, in practice, to subdivide these four classes into subclasses, and if it is desired to secure a subclassified showing or statement, the cards will be sorted into groups corresponding with the subclassification of accounts, and the amounts of the debits and credits in the various subclasses will be computed automatically in the manner already described. For convenience, the accounts falling within the first subclass of asset accounts may be given numbers from 1 to 99; the second subclass of asset accounts may be given numbers from 100 to 199, and so on through all of the several classes, thereby facilitating the sorting of the cards into the subgroups, as well as into the main groups as indicated in Fig. 2.

After the cards are sorted and computed automatically to secure the showing of assets, liabilities, expenses and revenues, and of such subtotals as may be desired, the cards will be sorted into groups in conformity with the scheme of numbers assigned upon the standard to the various primary ledger accounts, whereupon the totals of the various groups are automatically comp***d to secure the total debits and credits to each of the primary accounts.

In carrying out my invention as thus described, the various steps can be carried on wholly automatically and without the possibility of error due to the fallibility of human minds and hands, except for the steps of arranging the standard assigning the fields and punching them with the appropriate holes, and except also for the steps involving the subtraction of debits from credits or credits from debits. My invention may, however, be carried farther to secure the balances automatically. Before describing the mechanism whereby this is accomplished, I shall refer briefly to Fig. 3, which illustrates diagrammatically the totalizing registers and the manner in which the totals are to be combined to secure the appropriate balances.

Under the caption "Assets" I have shown two totalizers or registers marked, respectively, "Dr." and "Cr." In connection with each of these totalizers, I have indicated a hopper $h$ illustrative of the hopper or slot through which a group of cards is fed for computation, as in the Hollerith computing machines. Under the caption "Assets" I have, therefore, represented two Hollerith computing machines, which may be operated to ascertain and exhibit by means of totalizer numeral wheels the totals of the amounts represented upon the cards fed into the respective hoppers or slots. While I have spoken of these two totalizing devices as separate machines, they may, of course, be distinct totalizing units of a single machine.

The credits to asset accounts are to be subtracted from the debits to asset accounts to secure the net assets. I have, therefore, indicated a totalizer marked "Net assets" which is automatically operated to show the difference between the debits and the credits to asset accounts. Fig. 4 illustrates the construction and mode of operation of the necessary mechanism.

The totalizer marked "Net liabilities" is, in like manner, operated to display the difference between the credits and the debits to liability accounts.

Figure 3:
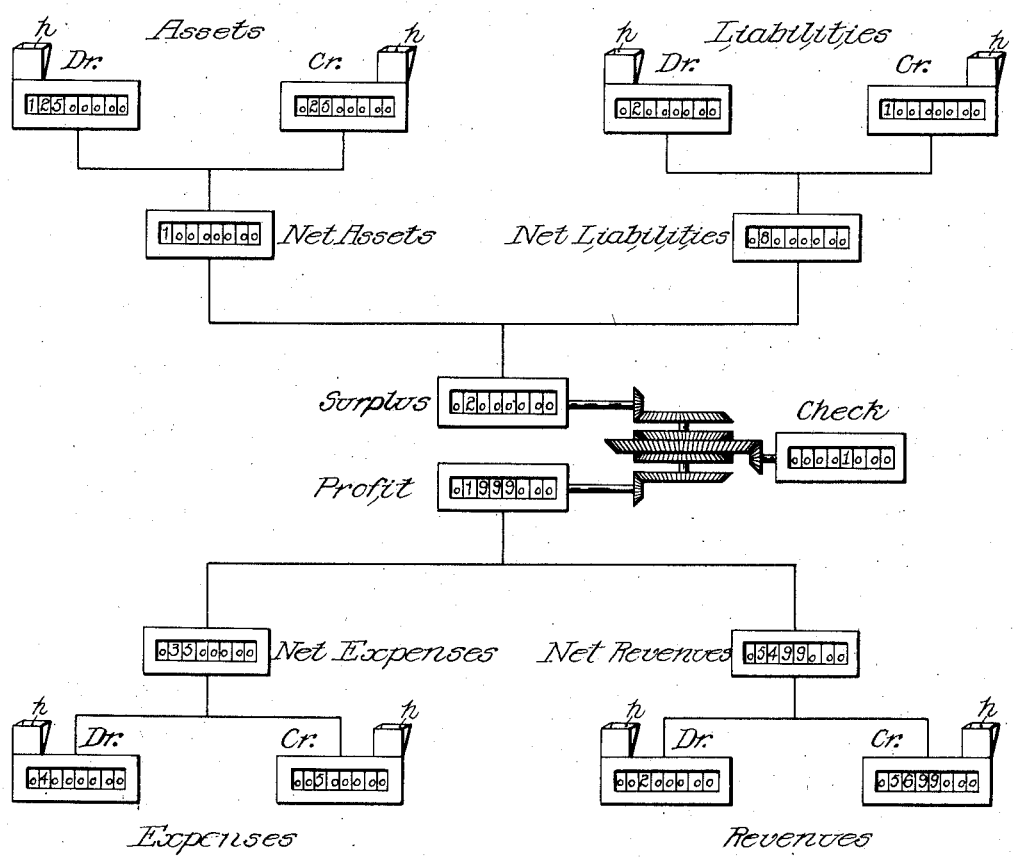
Fig. 3 is a diagrammatic representation of the manner in which certain classes of debits and credits may be combined to show the assets and liabilities, expenses and revenues, and the surplus and profit.

The surplus (or deficit) is the difference between net assets and net liabilities, and in Fig. 3 I have represented a totalizer marked "Surplus" which is operated automatically to display this difference—in other words, to display the surplus.

The lower half of Fig. 3 represents a similar combination of totalizers operating to show the total debits and the total credits to both expense accounts and revenue accounts, and operating also to show net expenses and net revenues, and to show also the difference between net expenses and net revenues, which is the profit (or loss).

Fig. 4 illustrates the mechanism necessary to combine or synthesize the totals computed in the several Hollerith computing machines or in the several units of a single machine. It may help in understanding the mechanism of Fig. 4, to point out that the numeral wheels of the totalizer marked "Surplus" in Fig. 3 must tend to advance in conformity with the advancement of the corresponding numeral wheels of the net assets totalizer. The numeral wheels of the net assets totalizer must tend to advance in conformity with the advancement of the corresponding numeral wheels of the totalizer assigned to the totalization of debits to asset accounts, but the numeral wheels of the net assets totalizer must also tend to move backwardly in conformity with the rotation of the corresponding numeral wheels of the totalizer assigned to credits to asset accounts. In like manner, the numeral wheels of the surplus register must tend to move not only forwardly in conformity with the rotation of the numeral wheels of the net assets register, but must tend also to move backwardly in conformity with the rotation of the numeral wheels of the net liabilities register.

In Fig. 4 I have represented the units, tens and hundreds numeral wheels of the surplus register at 100, 101 and 102. These numeral wheels are loosely mounted upon a shaft 103, the several numeral wheels being separated by appropriate spacers 104, 105, 106, etc. Each numeral wheel is formed integrally with a driving spur gear 107, 108, or 109, as the case may be. Each of these driving gears is adapted to be rotated by engagement with a driving pinion 110, 111 or 112, as the case may be. Let us confine our attention for a moment to the driving of the units numeral wheel 100 of the surplus register. This units numeral wheel must be advanced when the units numeral wheel of the net assets register is advanced, providing the units numeral wheel of the net liabilities register is at the moment stationary. It also must be driven backwardly when the units numeral wheel of the net liabilities register is advanced, providing the units numeral wheel of the net assets register is at that time stationary. The driving pinion 110 is, therefore, formed integrally with the bevel gear 113 of a differential gear, the mate 114 of this driving gear 113 being fastened rigidly to the frame, as for example, by means of the fixed journal shaft 115. The common gear 116 is provided with a bevel pinion 117 mounted upon a radial journal mounted in the common gear 116 in the usual manner. When, therefore, the common gear 116 is rotated, the bevel pinion 117 will roll upon the gear 114 to advance the bevel gear 113 and the driving pinion 110, as a result of which the rotation of the gear 116 will cause the rotation of the numeral wheel 100. The driving gear 116 of the differential set is in mesh with a spur gear 118. This gear 118 is a common gear of a differential set similar to that already described, except that the driving gears 119 and 120 are both rotatably mounted upon the journal shaft 120'. The driving gear 119 is formed integrally with a pinion 121, which is in mesh with a gear 122 formed integrally with the units numeral wheel 123 of the net liabilities register. The other driving gear 120 of the differential set, whose common gear is shown at 118, is formed integrally with a spur pinion 124 which is in mesh with a spur gear 125 formed integrally with the units numeral wheel 126 of the net assets register.

I shall now stop to describe the operation of this part of the mechanism. If the units numeral wheel 123 of the net liabilities register is advanced in the direction indicated by the arrow upon the spur gear 122, the spur pinion 121 will be rotated in the reverse direction, as indicated by the arrow upon the periphery of this wheel. Movement will be transmitted through the bevel driving gear 119 to the common gear 118 of the differential set, this common gear being caused to rotate in the direction shown by the arrow upon its periphery. Since this common gear 118 is in mesh with the spur gear 116, the latter will be caused to rotate in the direction of the arrow upon its periphery; and since the bevel gear 114 is fixed in position, the bevel gear 113 and the spur pinion 110 will be rotated in the direction shown by the arrow upon the periphery of the pinion 110. The rotation of the pinion 110 will cause the rotation of the gear 107 in mesh therewith, the latter being rotated in the direction of the arrow upon its periphery. If, therefore, the numeral wheel 123 is turned forwardly one-tenth of a revolution, the numeral wheel 100 will be turned backwardly one-tenth of a revolution. This, however, is on the assumption that the numeral wheel 126 has been meanwhile stationary. Let us now assume that the numeral wheel 123 remains fixed in position while the numeral wheel 126 is advanced one-tenth of a revolution, as indicated by the arrow upon the periphery of the associated gear wheel 125. Such rotation of the gear wheel 125 will cause the pinion 124 to rotate in the direction of the arrow upon its periphery. This pinion will, in turn, cause the bevel gear 120 to rotate in the direction of the arrow upon its periphery. This, in turn, will cause the common gear 118 of the differential set to be rotated in a direction the reverse of that indicated by the arrow upon its periphery. So also, as before, the gears and pinions 116, 110 and 107 will be caused to rotate in directions the reverse of those indicated by the arrows upon their peripheries. This, in turn, will cause the numeral wheel 100 to be turned in the direction the reverse of that indicated by the arrow upon the periphery of the associated gear 107. In other words, one-tenth of a forward revolution of the units numeral wheel 126 of the net assets register will cause a corresponding one-tenth forward rotation of the units numeral wheel 100 of the surplus register.

The units numeral wheel 123 of the net liabilities register is connected through gearing identical with that already described, as a result of which the forward rotation of the units numeral wheel 130 of the liabilities credit register will cause a corresponding forward rotation of the units numeral wheel 123 of the net liabilities register, whereas a forward rotation of the units numeral wheel 131 of the liabilities debit register will cause a corresponding backward rotation of the units wheel 123 of the net liabilities register. The operation of the differential gearing is such that the numeral wheels 130 and 131 may rotate simultaneously or at different times, but in any case the units numeral wheel of the net liabilities register will be moved forwardly or backwardly in conformity with the difference in the degree of rotation of the two numeral wheels 130 and 131. In like manner, the units numeral wheel 100 of the surplus register will be moved forwardly or backwardly in conformity with the difference in the degree of rotation of the two numeral wheels 126 and 123.

Thus far I have described only the driving of the several numeral wheels of units order. The numeral wheels of the tens order are connected through similar gearing to be operated in the same manner. Thus, for example, the tens numeral wheel 101 of the surplus register will be moved forwardly or backwardly in conformity with the difference in degree of rotation of the tens numeral wheel 140 of the net liabilities register and the tens numeral wheel 141 of the net assets register. In like manner, the tens numeral wheel 140 of the net liabilities register will be moved forwardly or backwardly in conformity with the difference in the degree of rotation of the tens numeral wheel 150 of the liabilities credit register and the tens numeral wheel 151 of the liabilities debit register. The hundreds numeral wheels are geared together in the same manner.

Thus far I have not referred to the fact that whenever a numeral wheel of a lower order in any of the totalizers passes from its 9 to its 0 position, it must "carry one" into the numeral wheel of the same totalizer or register of next higher order. I shall now describe the mechanism for effecting these carrying operations:

The units numeral wheel 100 of the surplus register is provided with a male Geneva carrying gear 170, the tooth of which is adapted to mesh in a female Geneva gear 171, the position of the carrying tooth being such that the gear 170 will cause the gear 171 to turn a tenth of a complete revolution whenever the numeral wheel 100 passes from its 9 to its 0 position, or vice versa. The female Geneva gear 171 is formed integrally with a bevel gear 172 which meshes with a bevel pinion 173 whose axis of rotation is fixed in position by a journal connected directly with the frame of the machine. This bevel pinion, in turn, meshes with a bevel gear 174, which is formed integrally with a similar bevel gear 175, the latter, however, being in mesh with the bevel pinion 176 of a differential gear set whose common gear is shown at 177. The bevel pinion 176 is in mesh also with a bevel gear 178, the latter being formed integrally with the driving pinion 111 which meshes with the driving gear 108 of the tens numeral wheel 101.

When, therefore, the units numeral wheel 100 of the surplus register moves from the 9 to the 0 position in a direction the reverse of that indicated by the arrow upon the associated driving gear 107, the female Geneva gear 171 will be caused to rotate in the direction of the arrow shown upon its periphery. The gears 172, 173, 174 and 175 will be caused to rotate in the directions indicated by the arrows placed upon their peripheries. We may assume, in tracing the motion, that the common gear 177 is stationary. The pinion 176 will, therefore, be rotated to transmit motion, driving pinion 111 in the direction of the arrow shown upon its periphery. The movement of this pinion will, in turn, cause the driving gear 108 associated with the tens numeral wheel 101 to be rotated for one-tenth of a revolution in the direction of the arrow shown upon its periphery. When, therefore, the units wheel 100 of the surplus register moves from its 9 to 0 position the tens numeral wheel 101 of the surplus register will be given a forward rotation of one-tenth of a revolution. Conversely, if the units numeral wheel of the surplus register is moved backwardly from its 0 to its 9 position, it will in effect subtract one from the tens order by causing the tens numeral wheel to rotate one-tenth of a revolution in the backward direction.

This motion necessary for the carrying operation will be transmitted and will have its effect upon the tens numeral wheel, even though the common gear 177 is being rotated at the time the carrying motion is being transmitted from the units numeral wheel.

The same sort of carrying mechanism is interposed between the tens numeral wheel and the hundreds numeral wheel of the surplus register, so that each order will carry into or subtract from the next higher order, as is necessary in order that the correct results may be displayed. These carrying operations will take place between any of the orders as may be necessary, regardless of the direct driving of the numeral wheels of the several orders. In other words, the carrying operations and the direct driving operations may take place simultaneously and without conflicting or interfering with one another.

It will be unnecessary to describe the mechanism for carrying between the numeral wheels of the several orders of the other registers, because in each instance the carrying mechanism is substantially identical with that already described.

The numeral wheels 130, 150 and 180 of the liabilities credit register are provided, as shown, with differential driving and carrying mechanism such as that already described, as a result of which the units numeral wheel 130 is driven by means of the units driving gear 181; the tens numeral wheel 150 is driven by the tens driving gear 182, and the hundreds numeral wheel is driven by the hundreds driving gear 183. These driving gears may be regarded as in mesh with the numeral wheels of corresponding order of a totalizer such as is shown in the aforesaid Hollerith Patent No. 998,095. If, as a matter of fact, these driving gears were connected respectively with the numeral wheels of the Hollerith totalizing register, there would be a duplication of numeral wheels displaying the same totals. The figures may, therefore, be omitted from the numeral wheels of the Hollerith totalizer, and the results read from the numeral wheels 130, 150 and 180.

Fig. 4 illustrates the whole of the surplus register, as indicated in Fig. 3. It indicates the whole of the net liabilities register. To save confusion, however, in reading the drawing, I have not shown the numeral wheels 126, 141 and 185 of the net assets register as provided with their carrying and driving mechanisms. These numeral wheels are shown in a plane slightly to the rear of that in which the surplus register and net liabilities register are arranged. It will be understood, however, that the net assets register is provided with mechanism for driving it in conformity with the difference between the amounts registered by the assets debit register and the assets credit register, just as the net liabilities register, as shown in Fig. 4, is arranged to be driven in conformity with the difference in the accumulations in the liabilities credit register and the liabilities debit register. I have shown in full the liabilities credit register, comprising numeral wheels 130, 150, 180, etc. The numeral wheels 131, 151 and 186 of the liabilities debit register fall, however, in a plane to the rear of that in which the registers fully shown are arranged, and to avoid confusion I have not, therefore, illustrated the carrying and driving mechanism associated with these numeral wheels of the liabilities debit register. The driving and carrying mechanism is identical, however, with that shown in conjunction wtih the numeral wheels 130, 150 and 180.

It will be apparent from the above description and the showing of Fig. 4 of the drawings, that the net liabilities register will at all times show the difference between the amounts accumulated in the liabilities credit register and the liabilities debit register, also that the net assets register will show at all times the difference between the accumulations in the assets debit register and the assets credit register, and also that the surplus register will show at all times the difference between the accumulations in the net assets register and the net liabilities register.

It will be apparent that the several registers may be provided with any number of numeral wheels, all connected together and operating in the manner illustrated in Fig. 4 in which, for convenience, I have illustrated registers having only three orders of numeral wheels.

The registers or totalizers assigned to expense debits, expense credits, revenue debits, revenue credits, net expenses, net revenues, and profit (or loss) are geared together in a manner identical with that shown in Fig. 4 and particularly described in connection with the upper half of the diagram of Fig. 3. The classification of accounts in a double-entry system may be and, in fact, should be such that the profit or loss displayed by the profit register will equal the surplus or deficit displayed by the surplus register for any given period of time. It is not uncommon to regard the surplus as accumulating from the commencement of the business, while the profit or loss is frequently accumulated for shorter periods of time as, for example, one year. In order that the profit shall equal the surplus, it is necessary that both be accumulated from the commencement of the business, or else that both be accumulated for like periods of time, as, for example, one year.

The numeral wheels of the surplus register and the numeral wheels of the profit register may be connected through differential driving mechanism, such as is illustrated in Fig. 4, with the numeral wheels of an equilibrium register such as that marked with the word "Check" in Fig. 3.

After a given lot of cards have been grouped and computed in the manner heretofore described, the check register should stand at zero because the amount shown by the profit register should equal the amount shown by the surplus register.

After a given lot of cards have been sorted and computed in the manner described and if it is found that the check register shows something other than zero, it is an immediate indication of the fact that there has been some mistake in the sorting or computing of the record cards. In Fig. 3, I have illustrated the check register as indicating a difference of $10.00 between the amount totalized in the surplus register and the amount totalized in the profit register. This discrepancy at once advises the necessity of an investigation to determine the source of error. Fig. 3 is drawn upon the assumption that there has been a failure to run the credit card B through the appropriate computing machine or unit. This card B represents a debit to account No. 10 and a credit to account No. 869. The amount is $10.00. Account No. 869 is a revenue account and it may be assumed that the failure to run this card through the computing machine or unit has been due to the loss of the card in handling. When a search for the lost card has located it, it may be run through the computing machine assigned to revenue credits. When, therefore, this card has been run through this computing machine or unit, the total of $56,990, as indicated in the revenue credit totalizer, will be increased to $57,000, correspondingly increasing the indication of the net revenue register from $54,990 to $55,000, and correspondingly increasing the indication of the profit register from $19,990 to $20,000. This added movement of the numeral wheels of the profit registers will cause a movement of the numeral wheels of the check register, as a result of which this register will read 00000000. While this showing is not a check upon the accuracy with which the record cards have been punched to conform with the transactions which they should represent, it is a check upon the accuracy with which the sorting, grouping, and computing have been accomplished.

It will be apparent that while my invention involves the use of the inventions disclosed in the early Hollerith patents, it involves an improvement upon the methods or arts claimed in Hollerith Patents Nos. 395,781 and 395,782. I have, therefore, chosen in some instances to claim my invention in language conforming, in so far as the subject-matter may be common, with the language of certain claims of said Hollerith patents. In reading and interpreting my claims, however, it should be understood that the term "card" is used broadly to cover the record of a single transaction, whether punched in a single sheet or in duplicate, triplicate, or other manifolded sheets. For convenience also, I have in the appended claims referred to the punching of a hole or holes in the card; but I intend such language to be interpreted broadly and as covering equivalents such, for example, as embossing elevations or depressions or impregnating limited areas with material adapted to render the impregnated area conductive of electricity, etc. I have found that language sufficiently comprehensive to cover in terms all such variations is difficult to follow except by assigning specific examples coming within the broad terminology, and I have, therefore, written my claims in language far more specific than is my concept, but in so doing I am distinctly relying upon the interpretation of these claims in such manner as to cover equivalents not coming within the precise terminology of the claims.

What I claim is:

1. The herein described improvement in the art of mechanical accounting which consists in first arranging a standard indicating the relative position in which characteristics of an individual transaction are to be recorded in an amount field and in a debit field and in a credit field, any given indicia in the credit field referring to the same account as the same indicia in the debit field; secondly, forming a record of each transaction by locating index points upon a card, said index points representing the account to be debited, the account to be credited and the amount of the transaction and bearing a determinate relation to each other and to the standard; thirdly, sorting said cards into groups determined by the location of index points representative of accounts and finally submitting the separate cards of each group successively to the action of controlling devices for operating registering devices representing the items to be compiled.

2. The improvement in the art of mechanical accounting as hereinbefore described, consisting in first locating a series of separate points upon a series of cards, such points arranged within a debit field, a credit field and an amount field upon each of a series of cards, each point having a fixed relation to all the others; secondly, apportioning the points within the debit field and those within the credit field among the several primary accounts of a given ledger series and giving to each account as its representative one or more points in the debit field and one or more corresponding points in the credit field; thirdly, forming upon each card the complete record of one individual transaction by punching in the representative point or points a circuit-controlling index hole or holes for the account to be debited, a circuit-controlling index hole or holes for the account to be credited and a hole or holes for the amount of the transaction; applying all the cards thus formed separately and successively once to circuit-controlling apparatus operated by the index holes designating the account to be debited and once to circuit-controlling apparatus operated by the index holes to designate the account to be credited; mechanically sorting and grouping the cards by means operated under the control of the circuit controlling apparatus; and separately totalizing the amounts represented by the hole or holes of each group.

3. The improvement in the art of mechanical accounting as hereinbefore described consisting in, first, locating a series of separate points upon a series of cards, such points arranged within a debit field, a credit field, and an amount field upon each of the series of cards, each point having a fixed relation to all of the others; secondly, apportioning the points within the debit field and those within the credit field among the several primary accounts of a given ledger series and giving to each account, as its representative, one or more points in the debit field and one or more points in the credit field; thirdly, forming upon each card the complete record of one individual transaction by punching in the representative point or points a circuit controlling index hole or holes for the account to be debited, a circuit controlling index hole or holes for the account to be credited, and a circuit controlling index hole or holes for the amount of the transaction; fourthly, applying all the cards thus formed, separately and successively, once to circuit controlling apparatus operated by the index holes to designate the account to be debited and once to circuit controlling apparatus operated by the index holes to designate the account to be credited, and mechanically sorting and grouping all of the cards by means controlled by the said circuit controlling apparatus.

4. The method which consists of the following steps: punching an accounting card counterbalancingly for a double-entry accounting transaction, to-wit: in one field with the number of the ledger account to be debited, in a second field with the number of the ledger account to be credited, and in a third field with the amount to be debited to the one and credited to the other of the two ledger accounts so punched; punching other cards in the same manner, one for each of the other simple accounting transactions in the series pertaining to a given ledger for a given period; sorting the cards so punched according to the accounts to be debited; computing the amounts of the cards so sorted by separately and successively applying each such debit cards of the group to controlling apparatus operated by the index holes representative of amounts; sorting the same cards according to the accounts to be credited; and finally, computing the amounts of the cards so sorted by separately and successively applying the cards of each such debit group to controlling apparatus operated by the index holes representative of amounts.

5. The art which consists in, punching each of a series of cards (each having a debit field, a credit field, and an amount field) in accordance with a different one of a series of business transactions, with a hole or holes in the debit field, a hole or holes in the credit field, and a hole or holes in the amount field,—all of said holes being punched in conformity with a pre-arranged standard in which each of a set of ledger accounts is distinguishably designated both in the debit field and in the credit field, and in which various amounts are distinguishably designated; and twice sorting the cards indicative of all of said transactions into groups, once under a control exercised by the hole or holes punched in the debit fields of said cards and once under a control exercised by the hole or holes punched in the credit fields of said cards.

6. The art which consists in, punching each of a series of cards (each having a debit field, a credit field, and an amount field) in accordance with a different one of a series of business transactions, with a hole or holes in the debit field, a hole or holes in the credit field, and a hole or holes in the amount field,—all of said holes being punched in conformity with a pre-arranged standard in which each of a set of ledger accounts is distinguishably designated both in the debit field and in the credit field, and in which various amounts are distinguishably designated; twice sorting the cards indicative of all of said transactions into groups, once under a control exercised by the hole or holes punched in the debit fields of said cards and once under a control exercised by the hole or holes punched in the credit fields of said cards; and separately totalizing the amounts represented by the holes punched in the amount fields of all of the cards of each such group by means controlled by the holes punched in the amount fields of the cards of each such group respectively.

7. A series of double-entry accounting cards for tabulating ledger accounts mechanically by tabulating machines of the Hollerith type, each having a debit field, a credit field, and an amount field, and each punched with a hole or holes to designate an account to be debited and an account to be credited and the amount of one of a journal series of transactions, all in conformity with a common pre-arranged standard in which each ledger account has assigned to it an index point or points both in the debit field and in the credit field.

In witness whereof, I hereunto subscribe my name this 9th day of October, A. D. 1913.

CHARLES H. TALLMADGE.

Witnesses:
 FREDERIC W. CLAUS,
 MARY L. TALLMADGE.